United States Patent
Brakensiek et al.

(10) Patent No.: US 10,564,791 B2
(45) Date of Patent: Feb. 18, 2020

(54) METHOD AND APPARATUS FOR TRIGGERING A REMOTE DATA ENTRY INTERFACE

(75) Inventors: Jorg Brakensiek, Mountain View, CA (US); Raja Bose, Mountain View, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 696 days.

(21) Appl. No.: 13/188,081

(22) Filed: Jul. 21, 2011

(65) Prior Publication Data

US 2013/0024777 A1    Jan. 24, 2013

(51) Int. Cl.
*G06F 3/048* (2013.01)

(52) U.S. Cl.
CPC .................................. *G06F 3/048* (2013.01)

(58) Field of Classification Search
CPC . G01C 21/3688; G06F 3/1454; G06F 9/4445; H04N 2201/0075
USPC ........................................................ 715/740
See application file for complete search history.

(56) References Cited

U.S. PATENT DOCUMENTS

| | | | |
|---|---|---|---|
| 2003/0025678 A1* | 2/2003 | Lee | G06F 3/0488 345/173 |
| 2004/0100480 A1 | 5/2004 | Lupu | |
| 2005/0246095 A1 | 11/2005 | Banet et al. | |
| 2007/0050054 A1* | 3/2007 | Sambandam Guruparan | G08C 19/28 700/65 |
| 2007/0079252 A1 | 4/2007 | Ramnani | |
| 2007/0203641 A1* | 8/2007 | Diaz et al. | 701/208 |
| 2008/0122847 A1* | 5/2008 | Takano | G06T 3/4092 345/428 |
| 2008/0284907 A1* | 11/2008 | Chiao | H04N 7/163 348/448 |
| 2009/0156251 A1* | 6/2009 | Cannistraro | G08C 17/02 455/557 |
| 2010/0011299 A1* | 1/2010 | Brodersen | H04L 67/36 715/740 |
| 2010/0138780 A1* | 6/2010 | Marano | G06F 3/1415 715/804 |

(Continued)

FOREIGN PATENT DOCUMENTS

| | | |
|---|---|---|
| CN | 1661331 A | 8/2005 |
| EP | 2 305 506 A1 | 4/2011 |

(Continued)

OTHER PUBLICATIONS

Bose et al., "Morphing Smartphones into Automotive Application Platforms," May 2011, pp. 53-61.*

(Continued)

*Primary Examiner* — Phuong H Nguyen
(74) *Attorney, Agent, or Firm* — Alston & Bird LLP

(57) ABSTRACT

Various methods triggering a remote data entry interface are provided. One example method includes receiving, at a device, a data entry field selection message notifying that data entry is desired, inhibiting a presentation of a data entry input interface on a display of the device, and causing a remote interface trigger message to be sent to a remote device to direct the remote device to present a remote data entry input interface on a display of the remote device. Similar and related example methods and example apparatuses are also provided.

18 Claims, 6 Drawing Sheets

(56) References Cited

U.S. PATENT DOCUMENTS

| | | | |
|---|---|---|---|
| 2010/0165199 A1* | 7/2010 | Lee | H04N 5/4403 348/563 |
| 2010/0220250 A1* | 9/2010 | Vanderwall | G01C 11/02 348/837 |
| 2010/0268941 A1* | 10/2010 | Pahlavan | G06F 9/4445 713/155 |
| 2010/0269039 A1 | 10/2010 | Pahlavan et al. | |
| 2010/0299436 A1* | 11/2010 | Khalid | G06F 1/1643 709/226 |
| 2010/0317332 A1* | 12/2010 | Bathiche | H04L 12/282 455/418 |
| 2011/0084919 A1* | 4/2011 | Lee | G06F 3/023 345/173 |
| 2011/0242122 A1 | 10/2011 | Bose et al. | |
| 2011/0246904 A1* | 10/2011 | Pinto | G06F 9/4445 715/740 |
| 2011/0267291 A1* | 11/2011 | Choi | G06F 1/1692 345/173 |
| 2011/0275391 A1* | 11/2011 | Lee | H04M 1/7253 455/500 |
| 2012/0050331 A1* | 3/2012 | Kanda | G06F 3/1454 345/649 |
| 2012/0084662 A1* | 4/2012 | Navarro | H04N 5/44543 715/740 |
| 2012/0084663 A1* | 4/2012 | Momchilov | G06F 3/0481 715/744 |
| 2012/0102549 A1* | 4/2012 | Mazzaferri | G06F 21/6218 726/4 |
| 2012/0256842 A1* | 10/2012 | Kalu | G06F 3/0237 345/169 |
| 2012/0311225 A1* | 12/2012 | De Angelis | G06F 3/038 710/316 |

FOREIGN PATENT DOCUMENTS

| | | |
|---|---|---|
| EP | 2 336 725 A1 | 6/2011 |
| JP | 2000-298634 A | 10/2000 |
| JP | 2003-244343 A | 8/2003 |
| JP | 2004-170708 A | 6/2004 |
| JP | 2005-265572 A | 9/2005 |
| JP | 2006-017478 A | 1/2006 |
| JP | 2007-025808 A | 2/2007 |
| JP | 2007-086354 A | 4/2007 |
| JP | 2007-302215 A | 11/2007 |
| JP | 2008-003093 A | 1/2008 |
| JP | 2009-035024 A | 2/2009 |
| JP | 2009-075763 A | 4/2009 |
| JP | 2009-090690 A | 4/2009 |
| JP | 2009-281991 A | 12/2009 |
| JP | 2010-272930 A | 12/2010 |
| JP | 2011-013861 A | 1/2011 |
| JP | 2011-112640 A | 6/2011 |
| JP | 2011-116304 A | 6/2011 |
| WO | WO 2003/044756 A1 | 5/2003 |
| WO | WO 2009/073806 A2 | 6/2009 |
| WO | WO 2011/073947 A1 | 6/2011 |

OTHER PUBLICATIONS

Nokia Corporation, "Terminal Mode Technical Architecture Release Candidate v0.9," 2010, 87 pages.*

U.S. Appl. No. 61/389,975 (Year: 2010).*

International Search Report for Application No. PCT/FI2012/050733 dated Feb. 14, 2013.

Office Action from Japanese Patent Application No. 2014-520694 dated Apr. 2, 2015.

Office Action for Chinese Application No. 201280045698.8 dated Nov. 2, 2014.

International Preliminary Report on Patentability/Written Opinion for Application No. PCT/FI2012/050733 dated Jan. 21, 2014.

Bose R. et al.; "Morphing Smartphones into Automotive Application Platforms"; *Computer, IEEE*, US; vol. 44, No. 5; May 1, 2011; pp. 53-61; XP011477975.

Bose R. et al.; "Terminal Mode-Transforming Mobile Devices into Automotive Application Platforms"; *Proceedings of the 2nd International Conference on Automotive User Interfaces and Interactive Vehicular Applications*; Nov. 11, 2010; p. 148; XP055083625.

Brakensiek, Jorg; "Terminal Mode Technical Architecture"; Jan. 1, 2010; pp. 1-87; XP055164187.

Extended European Search Report from European Patent Application No. 12814612.3 dated Feb. 17, 2015.

Office Action from Korean Patent Application No. 2014-7004415 dated May 22, 2015.

Office Action from Chinese Patent Application No. 201280045698.8 dated Jun. 3, 2015.

Office Action for Chines Application No. 201280045698.8 dated Jan. 22, 2016.

Office Action from corresponding Korean Patent Application No. 2014-7004415 dated May 30, 2016.

Office Action from corresponding Japanese Patent Application No. 2014-520694, dated Feb. 29, 2016.

Office Action from corresponding Japanese Patent Application No. 2014-520694, dated Dec. 16, 2016, with English summary, 6 pages.

Office Action for Koren Application No. 10-2014-7004415 dated Apr. 28, 2017, 6 pages.

Office Action for Korean Application No. 10-2014-7004415 dated Sep. 4, 2017, 6 pages.

Office Action for European Application No. 12814612.3 dated Apr. 16, 2018, 5 pages.

Office Action for India Application No. 1222/CHENP/2014 dated Jun. 26, 2018, 7 pages.

Office Action for European Application No. 12814612.3 dated Feb. 13, 2019, 8 pages.

* cited by examiner

METHOD AND APPARATUS FOR TRIGGERING A REMOTE DATA ENTRY INTERFACE

TECHNICAL FIELD

Embodiments of the present invention relate generally to the implementation of a remote user interface, and, more particularly, relate to a method and apparatus for triggering a remote data entry interface.

BACKGROUND

Mobile computing devices continue to evolve such that the devices are capable of supporting new and powerful applications. In some instances a handheld mobile device may include sufficient processing power, network connectivity, and memory storage to perform a given application, but the small form factor of a handheld mobile device may limit the usability of the application, for example, due to a small user interface and screen.

As such, in situations where the user may be stationary, relative to a remote device having a larger user interface (e.g., a computer terminal, an in-vehicle head unit, a tablet or pad device), the user may wish to use the user interface of the remote device, rather than the user interface of the handheld device. For example, considering a global positioning application, a user may wish to have a handheld mobile computing device connect with a device having a larger display in a vehicle for displaying maps and other location information on the remote device. Similarly, a mobile computing device operating as a media player may also connect with another device to provide the user with an interface to the mobile computing device via display located in the traditional location for a radio in a vehicle.

To interface with and support a remote user interface environment, the handheld mobile computing device may provide video and audio information to permit the reproduction of the user interface of the handheld device on the remote device. The remote device should be capable of fully interfacing with the handheld device to receive user input and provide output to the user, and the handheld device should support the remote device's ability to do so.

BRIEF SUMMARY

Example methods and example apparatuses are described that facilitate triggering a remote data entry interface. One example method embodiment includes receiving, at a device, a data entry field selection message notifying that data entry is desired, inhibiting a presentation of a data entry input interface on a display of the device, and causing a remote interface trigger message to be sent to a remote device to direct the remote device to present a remote data entry input interface on a display of the remote device.

An additional example embodiment is an apparatus comprising at least one processor and at least one memory including computer program code. The at least one memory and the computer program code may be configured to, with the at least one processor, direct the example apparatus to perform various functionality. In this regard, the example apparatus may be directed to perform receiving, at a device, a data entry field selection message notifying that data entry is desired, inhibiting a presentation of a data entry input interface on a display of the device, and causing a remote interface trigger message to be sent to a remote device to direct the remote device to present a remote data entry input interface on a display of the remote device.

Another example embodiment is an example non-transitory computer readable medium having computer program code stored thereon. When executed, the computer program may direct an apparatus to perform receiving, at a device, a data entry field selection message notifying that data entry is desired, inhibiting a presentation of a data entry input interface on a display of the device, and causing a remote interface trigger message to be sent to a remote device to direct the remote device to present a remote data entry input interface on a display of the remote device.

Another example embodiment is an apparatus comprising means for receiving, at a device, a data entry field selection message notifying that data entry is desired, means for inhibiting a presentation of a data entry input interface on a display of the device, and means for causing a remote interface trigger message to be sent to a remote device to direct the remote device to present a remote data entry input interface on a display of the remote device.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Figure 1:
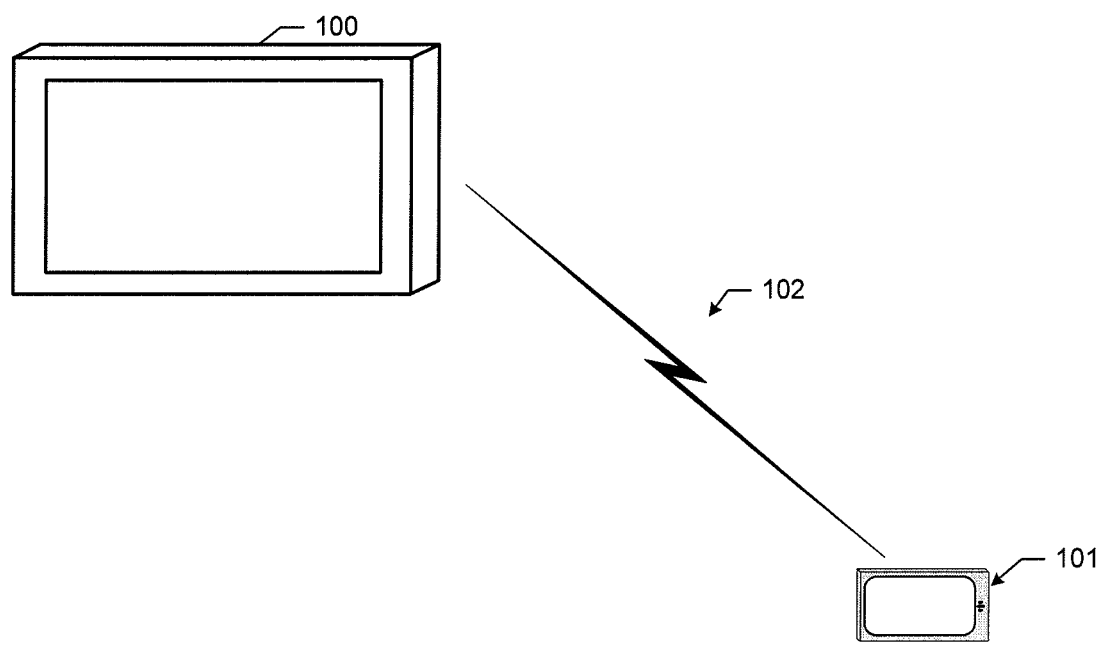
FIG. 1 illustrates a system for implementing a remote user interface according to various example embodiments.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 illustrates an example system in accordance with various example embodiments of the present invention. The example system includes a remote user interface (UI) device 100, User Equipment (UE) 101, and a communications link 102.

The remote UI device 100 may be any type of computing device configured to project or replicate the user interface of the UE 101. As such, the remote UI device 100 may include user interface components and functionality. The user interface components may be controlled by one or more processors and one more memories storing program code included in the remote UI device 100 for performing the functionality of the remote UI device 100 as described herein. In some example embodiments, the remote UI device 100 may include a touch screen display that is configured to receive input from a user via touch events with the display. The remote UI device 100 may alternatively or additionally include other user interface hardware, such as a physical keyboard or keypad, a mouse, a trackball, or other pointing device, speakers, a microphone, and the like. The remote UI device 100 may support various techniques of receiving user input including but not limited to voice recognition, handwriting recognition, and the like. In some example embodiments, the remote UI device 100 may be installed in a vehicle and the user interface that is provided by the remote UI device 100 may be a modified variation of the user interface of the UE 101 that complies with safety requirements for use in a vehicular environment. Further, the remote UI device 100 may include speakers, a microphone, and the like.

The remote UI device 100 may also include a wireless communications interface for communicating with the UE 101 via the communications link 102. According to some example embodiments, the remote UI device 100 and the UE 101 may communicate via a wired link. The communications link 102 may be any type communications link capable of supporting communications between the remote UI device 100 and the UE 101. According to some example embodiments, the communications link 102 may be a WLAN, Bluetooth, or other type of wireless link. The UE 101 may be any type of mobile computing and communications device. According to some example embodiments, the UE 101 may be a smart phone, tablet, or pad device. The UE 101 may also be configured to execute and implement applications via at least one processor and at least one memory included within the UE 101.

According to some example embodiments, the UE 101 may be configured to, via the communications connection 102, direct the remote UI device 100 to output a user interface and receive user input provided via the remote UI device 100. The projected user interface provided by the remote UI device 100 may be the same interface that is being presented on a display of the UE 101 or that would have been presented had the display of the UE 101 been active. In some example embodiments, framebuffer scanning or similar techniques may be used to reproduce at least a portion of a user interface on the of the remote UI device 100 via the communications link 102. In some example embodiments, the remote UI device 100 may provide a modified user interface that is derived from the user interface of the UE 101. For example, consider an example scenario where the remote UI device 100 is installed in a vehicle as a vehicle head unit. The driver of the vehicle may wish to use the remote UI device 100 as an interface to the UE 101 due, for example, to the convenient and safe location of the remote UI device 100 within the vehicle and/or the larger size of the screen. The UE 101 may be configured to link with the remote UI device 100, and direct the remote UI device 100 to present a user interface for engaging the user via the remote UI device 100. The display of the remote UI device 100 may include various controls that may or may not be associated with controls on the user interface of the UE 101, such as controls that are affixed to a steering wheel of a vehicle, touch controls, rotary knobs, and/or other configurable or dedicated buttons. In some instances the user interface provided by the remote UI device 100 may be a modified variation of the user interface of the UE 101 that is adapted for ease of use by a user that is also operating a moving vehicle.

The interaction between the UE 101 and the remote UI device 100 provides an example of mobile device interoperability, which may also be referred to as smart space, remote environment, and remote client. In some instances, the UE 101 may be described as being in the "terminal mode" when the remote UI device 100 is accessed and controlled the UE 101. The features and capabilities of the UE 101 may be projected onto an external environment (e.g., the remote UI device 100), and the external environment may appear as if the features and capabilities are inherent to external environment such that the dependency on the UE 101 is not apparent to a user. Projecting the UE 101's features and capabilities may involve exporting the user interface screen of the UE 101, as well as command and control to the external environment whereby, the user may comfortably interact with the external environment in lieu of the UE 101.

When the UE 101 is operating in the terminal mode, if a user touches a data entry field (e.g., a text entry field) on the display of the remote UI device 100, the touch event may be detected and located on the touch screen. Information about the touch event may then be sent to the UE 101 (e.g., using a Virtual Networking Computing (VNC) protocol or any other remote UI protocol). The UE 101, upon receiving a remote touch event, may emulate the touch event locally on the UE 101.

A touch event within a data entry field may then trigger the presentation of a virtual keyboard on the display of the UE 101, which may then also be replicated remotely on the display of the remote UI device 100, possibly using VNC or any other remote UI protocol. However, in implementations in a vehicle, where the driver is expected to interact with the remote UI device 100, safety and driver distraction requirements may be considered and access to the user interface of the UE 101 may be limited, and user interactions may be received by the remote UI device 100. This may be because UE 101's virtual key entry methods may not comply with driver distraction guidelines and are therefore may not be safe to use while driving. For example, a virtual keypad implemented on the UE 101 may require the user to touch a virtual key multiple times in order to create the intended key event, which would substantially distract a user while driving. Accordingly, the remote UI device 100 may present a specialized (driving-safe) virtual data entry user interface, such as a virtual keyboard or rotary speller implemented via controls on a steering wheel for use while driving. To cause the remote UI device 100 to implement this specialized data entry user interface (also referred to as a remote data entry input interface), the UE 101 may send a remote interface trigger message to the remote UI device 100. One example of a remote interface trigger message may be a VNC Virtual Keyboard Trigger message that is part of the some Terminal Mode specifications.

Figure 2:
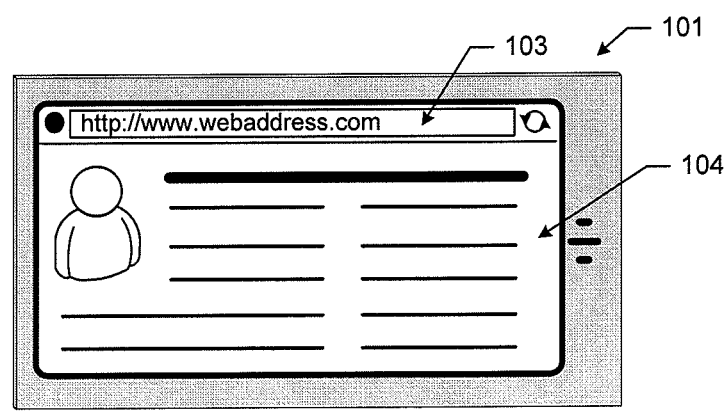
FIG. 2 illustrates a user equipment displaying content and a data entry field according to various example embodiments.
Figure 3:
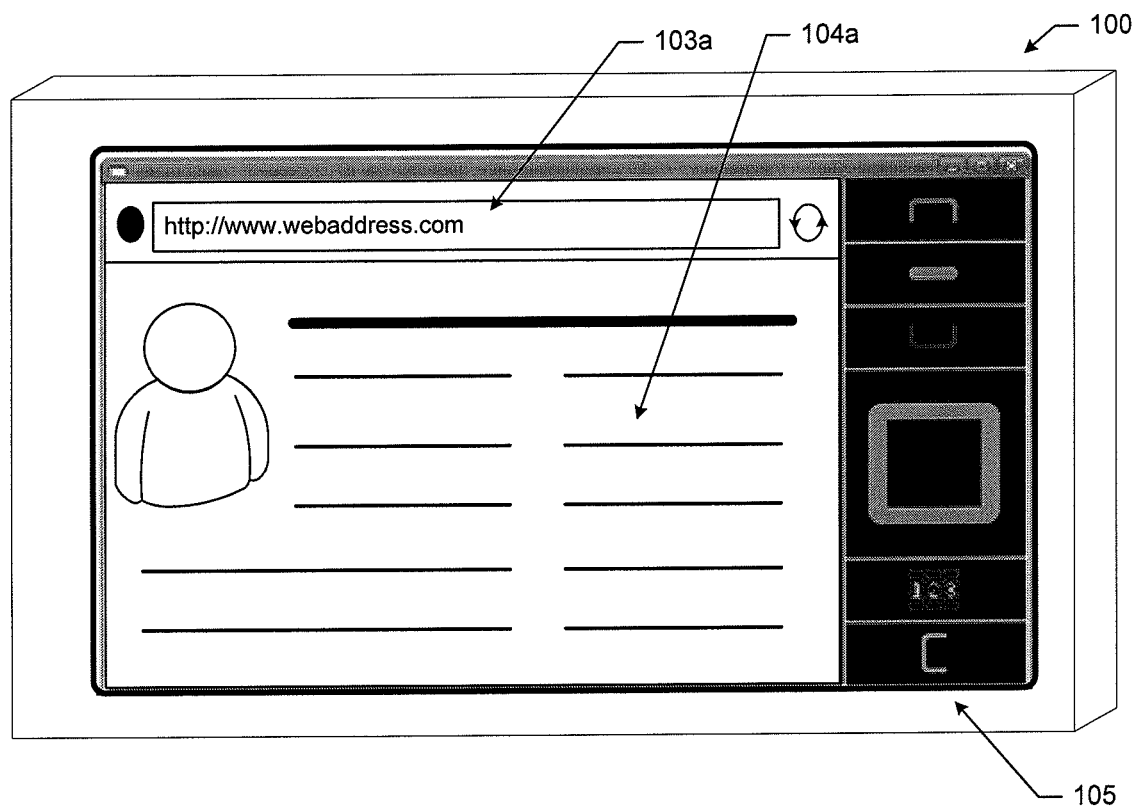
FIG. 3 illustrates a remote user interface device projecting the user interface of a user equipment according to various example embodiments.

FIGS. 2 and 3 illustrate and example scenario where the user interface of the UE 101 is being projected or replicated onto the display of the remote UI device 100 because the UE is in the terminal mode. FIG. 2 illustrates the UE 101 having navigated to a particular website. The content of the web site 104 is displayed together with a data entry field 103 that has the current uniform resource locator (URL) as the current data content (data value) in the data entry field 103. FIG. 3 provides an illustration of an example remote UI device 100 that is providing a projected user interface of the UE 101 of FIG. 2. The content 104 is projected to the remote UI device 100 as content 104*a* and the data entry field 103 is projected to the data entry field 103*a*. The user interface of the remote UI device 100 also presents additional controls 105 that may facilitate safe use the remote UI device 100 in, for example, a vehicular environment.

When the remote UI device 100 is projecting or replicating the user interface of the UE 101, the remote UI device 100 may also need to facilitate a user's ability to input data via the remote UI device 100, to be provided to the UE 101. In this regard, a user may wish to enter data (e.g., text) into a data entry field (e.g., a text field) that has been projected to the remote UI device 100, such as the data entry field 103*a* of FIG. 3. To change the data in the data entry field, the user may select the data entry field 103*a* (e.g., via a touch of the field on the screen) of the remote UI device 100.

Figure 4:
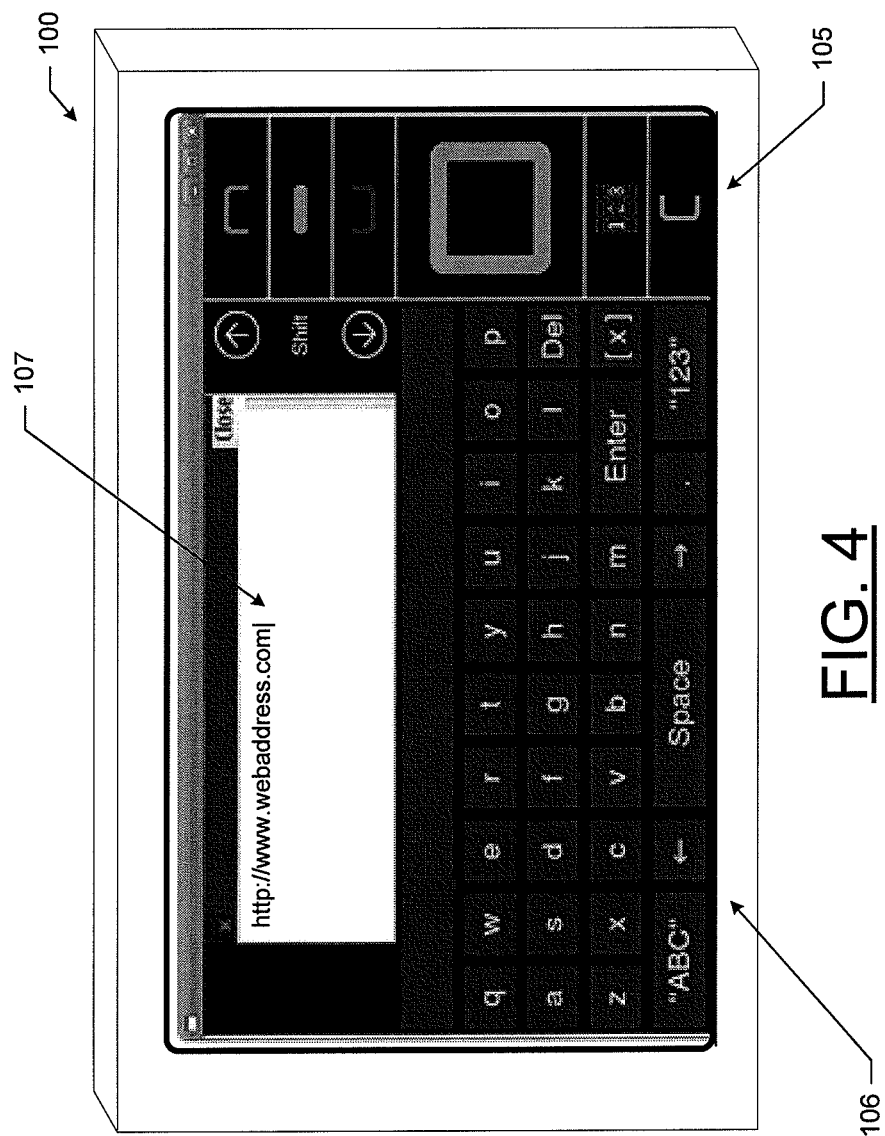
FIG. 4 illustrates a remote user interface device displaying a virtual keyboard for entering data into a data entry field according to various example embodiments.

If this type of operation were taking place directly on the UE 101, a virtual keyboard may be provided, that may cover a portion of the screen to permit user input of, for example, text characters. However, in the terminal mode, the interaction is occurring between the user and the remote UI device 100. The remote UI device 100 may be configured to similarly supply the user with a virtual keyboard or some other type of data entry input interface. However, the remote data entry interface of the remote UI device 100 may be modified to, for example, be displayed as a larger keyboard to facilitate ease of use during driving. For example, the virtual keyboard that is used on the remote UI device 100 may be an over-sized or full-screen keyboard with a data entry field/box combination. FIG. 4 illustrates an example of an oversized virtual keyboard 106 with a data entry field 107 being displayed on the remote UI device 100. The particular keyboard to be presented on the remote UI device 100 may be triggered for presentation by a remote interface trigger message such as a VNC Virtual Keyboard Trigger message, which may be sent from the UE 101.

When a user touches a data entry field on the user interface of the remote UI device 100, an interface trigger event, such as a virtual key entry event, may be generated by the operating system of the UE 101, and, in accordance with various example embodiments, the interface trigger event may be intercepted thereby inhibiting the presentation of a data entry input interface on the display of the UE 101. Instead of the UE 101 displaying the data entry interface (e.g., a virtual keyboard) locally on the UE 101's display, the UE 101 may then send a remote interface trigger message, such as a Virtual Keyboard Trigger message, to the remote UI device 100 to cause presentation of a remote data entry input interface on the remote UI device's display.

Further, if a data entry interface disabled event (e.g., a virtual key entry disabled event) occurs on the UE 101 to cause the local data entry input interface (the presentation of which may have been inhibited) to be closed or go off-screen, the data entry interface disabled event may be sent to the remote UI device 100 to cause removal of the remote data entry input interface from the display of the remote UI device 100. For example, a data entry interface disabled event can occur if the UE 101 presents, in addition to the remote data entry input interface, a list of predetermined values (such as search history) for a data entry field, and the user selects one of the values from the list instead of entering data via the remote data entry input interface.

According to some example embodiments, in addition to intercepting the interface trigger event, the UE 101 may be configured to intercept the type of data entry input interface that is being triggered for use on the UE 101. The various types of data entry input interfaces may include a QWERTY keyboard, numeric keypad, dialer, or the like. The UE 101 may therefore be configured to send a remote interface trigger message and the type of remote data entry input interface to the remote UI device 100, and the remote UI device 100 may responsively present the appropriate remote data entry input interface based on the received type.

According to some example embodiments, in addition to intercepting the interface trigger event, the UE 101 may be configured to optionally intercept the relative position and the relative size of the data entry input interface that is being triggered for use on the UE 101. Based on the user interface on the UE 101, the data entry input interface may be positioned at a specific location relative to the entire display and may also be of a specific size relative to the total display area. For example, in case a list of predetermined values (such as search history) is presented, the data entry input interface may occupy only 50% of the total screen area as opposed to occupying the entire screen. The UE 101 may therefore be optionally configured to send a remote interface trigger message and the desired relative position (x, y coordinate offsets) and relative size of the remote data entry input interface to the remote UI device 100, and the remote UI device 100 may responsively present the appropriate remote data entry input interface based on the received position and size information.

In some example embodiments, the remote UI device 100 may be connected to one or more vehicle control and/or monitoring systems to receive vehicle context information. The context information may include parameters such as speed, visibility conditions, cruise control state, and the like. The remote UI device 101 may be configured to consider the context information when determining the type of remote data entry input interface to present on the screen of the remote UI device 100. For example, if the vehicle speed is high based on defined thresholds, and a QWERTY keyboard is needed, then a rotary non-touch speller controlled from the steering wheel can be displayed rather than the touch-based QWERTY virtual keyboard.

Intercepting the interface trigger event may one manner in which a data entry input interface of the UE 101 can be inhibited. In some example embodiments, a terminal mode application may be used that temporarily replaces a local user interface application (e.g., a local virtual keyboard application) on the UE 101. This terminal mode application may be configured to only send remote interface trigger messages to the remote UI device 100 and does not generate interface trigger events local to the UE 101 while the application is being implemented. In this manner, implementation of the terminal mode application may operate to inhibit the presentation of the data entry input interface on the UE 101.

According to some example embodiments, another option for inhibiting the presentation of a data entry input interface on a UE 101 may be to detect and prevent the intended start of the local user interface application which is configured to present the data entry input interface (e.g., the local virtual keyboard application) and send the a remote interface trigger message instead of starting the local user interface application.

According to some additional example embodiments, inhibiting the presentation of a data entry input interface on a UE 101 may involve monitoring and intercepting the inter-process communications on the UE 101. This option may be implemented in situations where, for example, the local user interface application that causes the data entry input interface to be presented is continuously running, possibly in the background.

Figure 5:
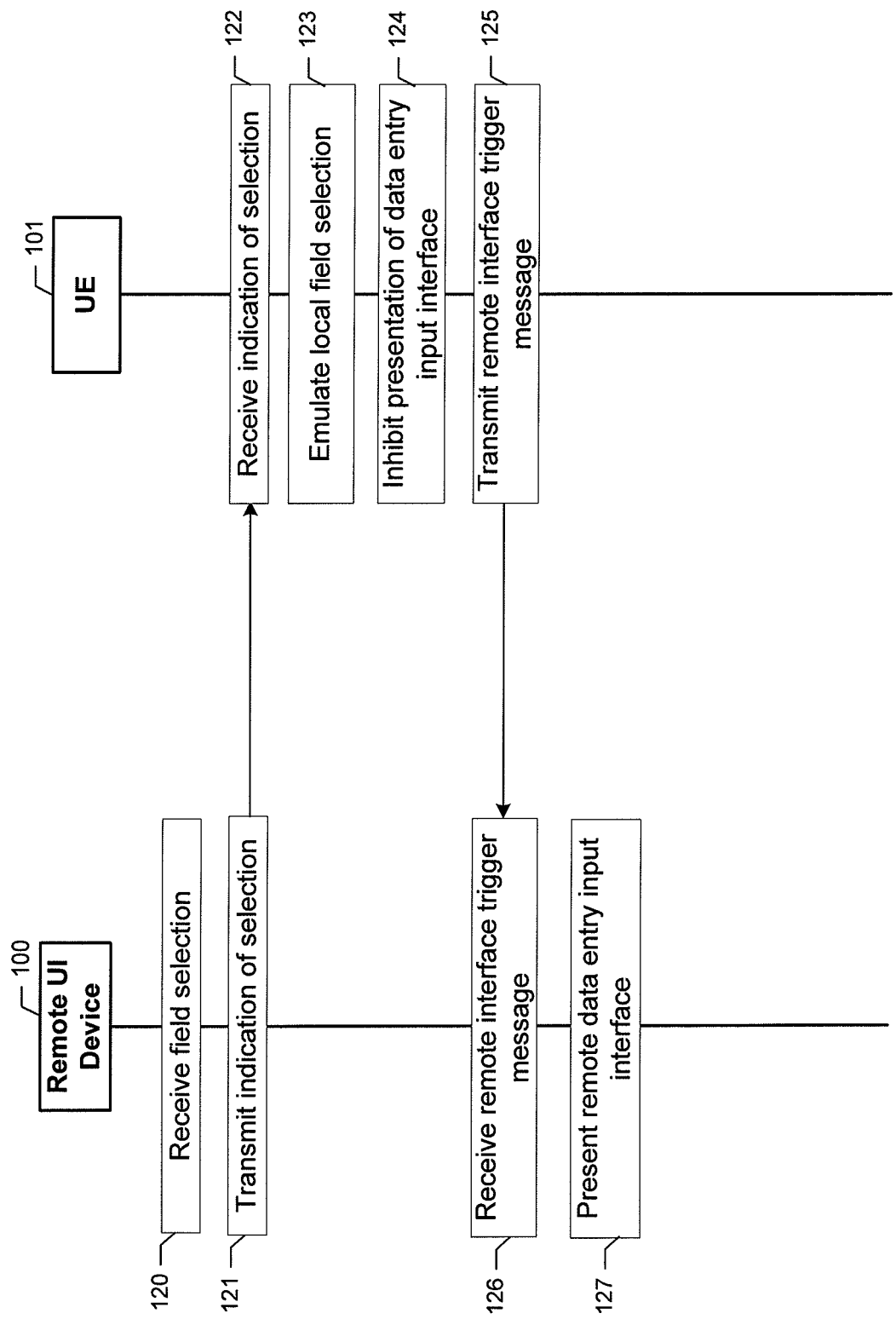
FIG. 5 is a signaling and operational flow diagram for triggering a remote data entry interface according various example embodiments.

In view of the foregoing, FIG. 5 illustrates a signaling and flow diagram of example methods of the present invention from a system perspective, as well as, from the perspectives of each of the remote UI device 100 and the UE 101. Within the context of FIG. 5, the remote UI device 100 and the UE 101 share a communications connection that permits the user interface of the UE 101 (or a subset thereof) to be projected or replicated onto the user interface of the remote UI device 100. In this regard, the remote UI device 100 may be connected to the UE 101 using a remote framebuffer/desktop protocol while implementing a terminal mode that projects the UE 101's screen, or a portion of the screen, on the display of the remote UI device 100.

At 120, the remote UI device 100 receives a data entry field selection. In this regard, for example, a user may touch a data entry field (e.g., a text entry field) on the display of the remote UI device 100 to perform the selection that is received by the remote UI device 100. In response to the selection of a data entry field, the remote UI device 100 may be configured to transmit an indication of the selection at 121 in the form of a data entry field selection message. The UE 101 may receive the data entry field selection message at 122 as a notification that selection of a data entry field has occurred. The data entry field selection message may include a description of a touch event at particular coordinates of the display and the UE 101 may determine that the event is a selection of a data entry field upon analyzing the coordinates relative to the current presented content. The data entry field selection message may be sent via a remote protocol, for example as a VNC Pointer Event message, to the UE 101. At 123, the UE 101 may be configured to locally emulate a local field selection based on the parameters of the data entry field selection message.

According to some example embodiments, rather than receiving an indication of a selection at the remote UI device 100, the UE 101 may generate an indication, possibly locally, that a data entry input interface is needed to permit a user to input data. In this regard, the UE 101 may be notified that data entry by a user is desired. As such, this generated indication need not originate from the remote UI device 100. For example, the UE 101 may be implementing an application that may require data entry at, for example, a particular time, or based on some other criteria that is not dependent on the remote UI device 100.

At 124, the UE 101 may be configured to inhibit the presentation of the data entry input interface as described above. In this regard, according to some example embodiments, the UE 101 may be configured to generate an interface trigger event, local to the UE 101, to present the data entry input interface on a display of the UE 101 in response to receiving the data entry field selection. Inhibiting the presentation of the data entry input interface may include intercepting and suppressing the trigger event. In some example embodiments, inhibiting the presentation of the data entry input interface may include implementing a terminal mode application on the UE 101, where the terminal mode application is configured to inhibit generation of a trigger event that would cause the presentation of the data entry input interface on the display of the UE 101.

Upon detection of the intercepted attempt to trigger the data entry input interface, or in response to a notification that data entry is desired, the UE 101 may be configured to transmit a remote interface trigger message at 125 and the remote UI device 100 may receive the remote interface trigger message at 126. In this manner, the UE 101 may trigger the presentation of a remote data entry interface (e.g., a virtual keyboard) on the remote IU device 100, which may enable the entry of data in an associated data entry field. The remote interface trigger message may be a VNC Terminal Mode (TM) Virtual Keyboard Trigger message, and the message may notify the remote UI device 100 of the need for data (e.g., text) input support.

At 127, the remote UI device 100 may be configured to present a remote data entry input interface to permit user entry of data via the interface. In some example embodiments, the type of remote data entry input interface may be determined based on information provided in the remote interface trigger message and/or based on context information of a vehicle that the remote UI device 100 is installed within.

According to various example embodiments described herein, inhibiting the presentation of the data entry input interface on the UE 101 and responsively triggering the presentation of a remote data entry input interface on the remote UI device 100 provides a number of advantages. For example, according to some example embodiments, a stable and reliable trigger can be implemented for presenting the remote data entry input interface, where false positives and misses are reduced or eliminated, and the triggering can be based on user action. Further, according to some example embodiments, implementation need not require changes to existing legacy applications. Additionally, according to some example embodiments, context information of a vehicle associated with the remote UI device 100 may be used to determine which type of remote data entry input interface is to be presented.

Figure 6:
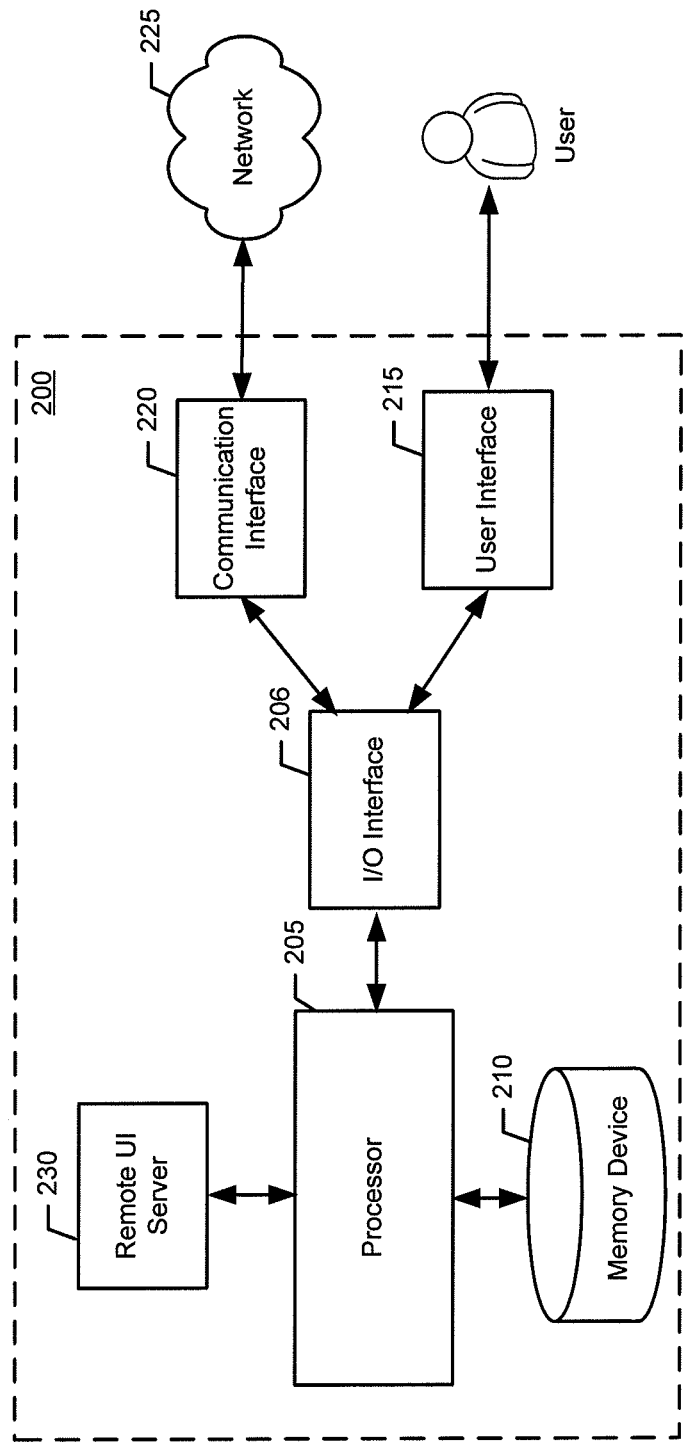
FIG. 6 illustrates a block diagram of an apparatus of a user equipment configured according to various example embodiments.
Figure 7:
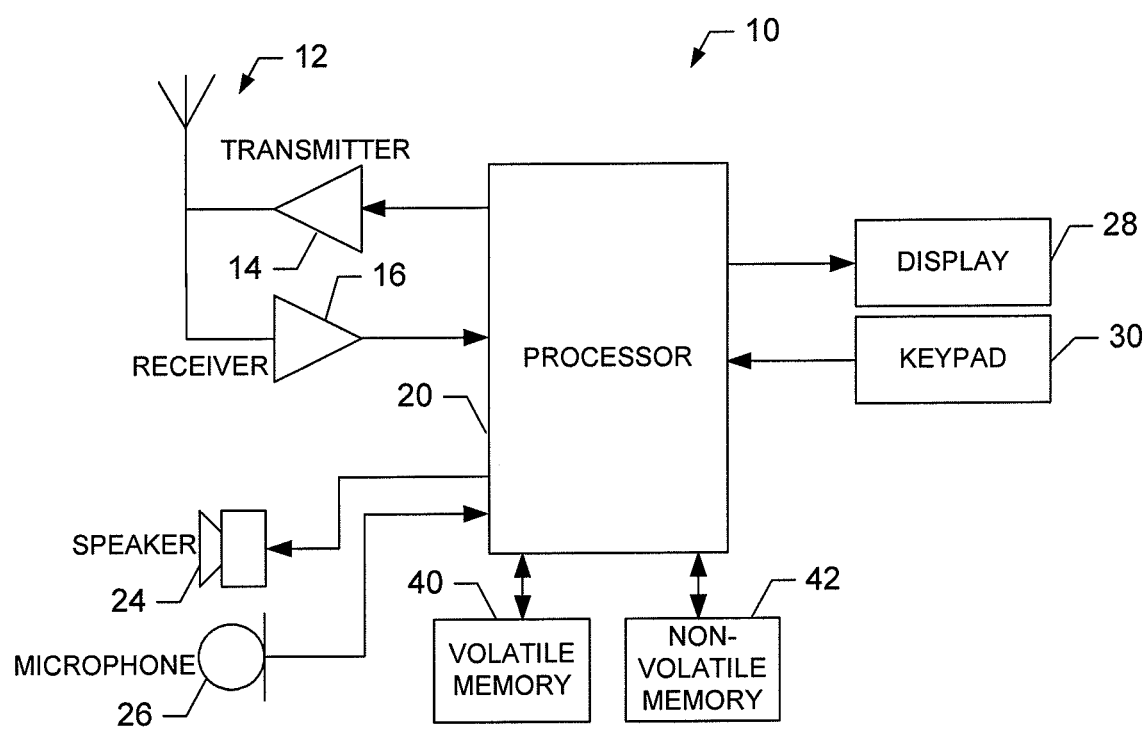
FIG. 7 illustrates a block diagram of a mobile terminal configured according to various example embodiments.

The description provided above and generally herein illustrates example methods, example apparatuses, and example computer programs stored on a non-transitory computer readable medium for triggering a remote data entry interface. FIGS. 6 and 7 illustrate example apparatus embodiments of the present invention configured to perform the various functionalities described herein. FIG. 6 depicts an example apparatus that is configured to perform various functionalities from the perspective of a UE (e.g., UE 101) as described with respect to FIGS. 1-5 and as generally described herein. FIG. 7 depicts an example UE apparatus in the form of a more specific mobile terminal configured to perform various functionalities from the perspective of a UE 101 depicted in FIGS. 1-5 and as generally described herein. The example apparatuses depicted in FIGS. 6 and 7 may also be configured to perform example methods of the present invention, such as those described with respect to FIG. 5.

Referring now to FIG. 6, in some example embodiments, the apparatus 200 may, be embodied as, or included as a component of, a communications device with wired and/or wireless communications capabilities. In this regard, the apparatus 200 may be configured to operate in accordance with the functionality of a UE as described herein. In some example embodiments, the apparatus 200 may be part of a communications device (e.g., UE 101), such as a stationary or a mobile terminal. As a mobile terminal, the apparatus 200 may be a mobile computer, mobile telephone, a portable digital assistant (PDA), a pager, a mobile television, a gaming device, a mobile computer, a laptop computer, a camera, a video recorder, an audio/video player, a radio, smart phone, tablet or pad device and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface 206, a communications interface 220, user interface 215, and a remote UI server module 230. The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), other circuitry, and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions or computer program code stored on a non-transitory computer-readable storage medium, the instructions specifically configure the processor 205 to perform the algorithms and operations described herein (e.g., those described with respect to FIG. 5). In some example embodiments, the processor 205 is a processor of a specific device (e.g., a mobile terminal) configured for employing example embodiments of the present invention by further configuration of the processor 205 via executed instructions for performing the algorithms, methods, and operations described herein.

The memory device 210 may be one or more non-transitory computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210, which may be one or more memory devices, may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, software, or a combination of hardware and software that is configured to interface the processor 205 with other circuitry or devices, such as the communications interface 220 and the user interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 220 may be any device or means (e.g., circuitry) embodied in hardware, a computer program product, or a combination of hardware and a computer program product that is configured to receive and/or transmit data from/to a network 225 and/or any other device or module in communication with the example apparatus 200 (e.g., remote UI device 100). The communications interface may be configured to communicate information via any type of wired or wireless connection, and via any type of communications protocol, such as a communications protocol that supports cellular communications or near field communications. According to various example embodiments, the communication interface 220 may be configured to support the transmission and reception of communications in a variety of networks including, but not limited to Internet Protocol-based networks (e.g., the Internet), cellular networks, or the like. Further, the communications interface 220 may be configured to support device-to-device communications, such as in a mobile ad hoc network (MANET). Processor 205 may also be configured to facilitate communications via the communications interface 220 by, for example, controlling hardware comprised within the communications interface 220. In this regard, the communication interface 220 may comprise, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 220, the example apparatus 200 may communicate with various other network entities in a device-to-device fashion and/or via indirect communications via a base station, access point, server, gateway, router, or the like.

The user interface 215 may be in communication with the processor 205 to receive user input via the user interface 215 and/or to present output to a user as, for example, audible, visual, mechanical or other output indications. The user interface 215 may include, for example, a keyboard, a mouse, a joystick, a display (e.g., a touch screen display), a microphone, a speaker, or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (e.g., software and/or firmware) stored on a memory accessible to the processor 205 (e.g., volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The remote UI server module 230 of example apparatus 200 may be any means or device embodied, partially or wholly, in hardware, a non-transitory computer readable medium having a computer program stored thereon, or a combination of hardware and a non-transitory computer readable medium having a computer program stored thereon, such as processor 205 implementing stored instructions to configure the example apparatus 200, or a hardware configured processor 205, that is configured to carry out the functions of the remote UI server module 230 as described herein. In an example embodiment, the processor 205 includes, or controls, the remote UI server module 230. The remote UI server module 230 may be, partially or wholly, embodied as processors similar to, but separate from processor 205. In this regard, the remote UI server module 230 may be in communication with the processor 205. In various example embodiments, the remote UI server module 230 may, partially or wholly, reside on differing apparatuses such that some or all of the functionality of the remote UI server module 230 may be performed by a first apparatus, and the remainder of the functionality of the remote UI server module 230 may be performed by one or more other apparatuses.

The apparatus 200 and the processor 205 may be configured to perform the following functionality via the remote UI server module 230. In this regard, the remote UI server module 230 may be configured to receive, at the processor 205 and/or the apparatus 200, a data entry field selection message or other type of notification that data entry is desired. The remote UI server module 230 may also be configured to inhibit a presentation of a data entry input interface on a display of the device, and cause a remote interface trigger message to be sent to a remote device to direct the remote device to present a remote data entry input interface on a display of the remote device.

In some example embodiments, the remote UI server module 230 may be further configured to generate an interface trigger event, local to the device, to present the data entry input interface on the display of the device in response to receiving the data entry field selection message. In some example embodiments, the remote UI server module 230 being configured to inhibit the presentation of the data entry input interface includes being configured to intercept the interface trigger event to thereby inhibit the presentation of the data entry input interface on the display of the device. Additionally or alternatively, the remote UI server module 230 may be further configured to cause the remote interface trigger message to be sent to the remote device in response to intercepting the interface trigger event. In some example embodiments, the remote UI server module 230 may be additionally or alternatively be configured to implement a terminal mode application on the device, the terminal mode application being configured to inhibit generation of an interface trigger event that would cause the presentation of the data entry input interface on the display of the device. In some example embodiments, the remote UI server module 230 may be configured to cause the remote interface trigger message to be sent to the remote device in response to intercepting the interface trigger event, the remote interface trigger message including the type of data entry input interface to be presented. Additionally or alternatively, the remote UI server module 230 may be configured to cause the remote interface trigger message to be sent to the remote device to direct the remote device to present a remote data entry input interface on a display of the remote device, the remote data entry input interface being presented based on context information of an environment in which the remote device is installed.

Referring now to FIG. 7, a more specific example apparatus in accordance with various embodiments of the present invention is provided. The example apparatus of FIG. 7 is a mobile terminal 10 configured to communicate within a wireless network, such as a cellular communications network. The mobile terminal 10 may be configured to perform the functionality of UE 101 and/or apparatus 200 as described herein. In some example embodiments, the mobile terminal 10 may be caused to perform the functionality of the remote UI server module 230 via the processor 20. In this regard, processor 20 may be an integrated circuit or chip configured similar to the processor 205 together with, for example, the I/O interface 206. Further, volatile memory 40 and non-volatile memory 42 may configured to support the operation of the processor 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface.

As described above, FIG. 5 illustrates flowcharts of example systems, methods, and/or computer programs stored on a non-transitory computer readable medium (e.g., computer program product) according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a non-transitory computer-readable storage medium having one or more computer program code instructions, program instructions, or executable computer-readable program code instructions stored therein. In this regard, program code instructions may be stored on a memory device, such as memory device 210, of an example apparatus, such as example apparatus 200, and executed by a processor, such as processor 205. As will be appreciated, any such program code instructions may be loaded onto a computer or other programmable apparatus (e.g., processor 205, memory device 210, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, at a device, a data entry field selection message, from a remote device, notifying that data entry is desired, the data entry field selection message comprising a description of an event associated with a user input on a data entry field;
    generating an interface trigger event, local to the device, to present the data entry input interface on a display of the device in response to receiving the data entry field selection message;
    inhibiting, at a remote user interface server module of the device, a presentation of the data entry input interface on the device, wherein inhibiting the presentation of the data entry input interface includes intercepting the interface trigger event to thereby inhibit the presentation of the data entry input interface on the display of the device; and
    causing a remote interface trigger message to be sent from the remote user interface server module of the device to the remote device to direct the remote device to present a remote data entry input interface on a display of the remote device to facilitate entry of data associated with the data entry field.

2. The method of claim 1, wherein causing the remote interface trigger message to be sent includes causing the remote interface trigger message to be sent to the remote device in response to intercepting the interface trigger event.

3. The method of claim 1, wherein inhibiting the presentation of the data entry input interface is performed by implementing a terminal mode application on the device, the terminal mode application being configured to inhibit generation of an interface trigger event that would cause the presentation of the data entry input interface on the display of the device.

4. The method of claim 1, wherein the method further comprises generating an interface trigger event, local to the device, to present the data entry input interface on the display of the device in response to receiving the data entry field selection, the interface trigger event indicating a type of data entry input interface to be presented;
    wherein inhibiting the presentation of the data entry input interface includes intercepting the interface trigger event to thereby inhibit the presentation of the data entry input interface on the display of the device; and
    wherein causing the remote interface trigger message to be sent includes causing the remote interface trigger message to be sent to the remote device in response to intercepting the interface trigger event, the remote interface trigger message including the type of data entry input interface to be presented.

5. The method of claim 1, wherein causing the remote interface trigger message to be sent includes causing the remote interface trigger message to be sent to the remote device to direct the remote device to present a remote data entry input interface on a display of the remote device, the remote data entry input interface being presented based on context information of an environment in which the remote device is installed.

6. The method of claim 1, further comprising:
obtaining information regarding location and size of the data entry input interface; and
causing the remote interface trigger message including the information to be sent from the remote user interface server module of the device to the remote device to direct the remote device to present the remote data entry input interface on the display of the remote device based on the information.

7. An apparatus comprising at least one processor and at least one memory including computer program code, the at least one memory and the computer program code configured to, with the at least one processor, direct the apparatus at least to:
receive, at a device, a data entry field selection message, from a remote device, notifying that data entry is desired, the data entry field selection message comprising a description of an event associated with a user input on a data entry field;
generate an interface trigger event, local to the device, to present the data entry input interface on a display of the device in response to receiving the data entry field selection message;
inhibit, at a remote user interface server module of the device, a presentation of the data entry input interface on the device, wherein inhibiting the presentation of the data entry input interface includes intercepting the interface trigger event to thereby inhibit the presentation of the data entry input interface on the display of the device; and
cause a remote interface trigger message to be sent from the remote user interface server module of the device to the remote device to direct the remote device to present a remote data entry input interface on a display of the remote device to facilitate entry of data associated with the data entry field.

8. The apparatus of claim 7, wherein the apparatus directed to cause the remote interface trigger message to be sent includes being directed to cause the remote interface trigger message to be sent to the remote device in response to intercepting the interface trigger event.

9. The apparatus of claim 7, wherein the apparatus directed to inhibit the presentation of the data entry input interface includes being directed to implement a terminal mode application on the device, the terminal mode application being configured to inhibit generation of an interface trigger event that would cause the presentation of the data entry input interface on the display of the device.

10. The apparatus of claim 7, wherein the apparatus is further configured to generate an interface trigger event, local to the device, to present the data entry input interface on the display of the device in response to receiving the data entry field selection, the interface trigger event indicating a type of data entry input interface to be presented;
wherein the apparatus directed to inhibit the presentation of the data entry input interface includes being directed to intercept the interface trigger event to thereby inhibit the presentation of the data entry input interface on the display of the device; and
wherein the apparatus directed to cause the remote interface trigger message to be sent includes being directed to cause the remote interface trigger message to be sent to the remote device in response to intercepting the interface trigger event, the remote interface trigger message including the type of data entry input interface to be presented.

11. The apparatus of claim 7, wherein the apparatus directed to cause the remote interface trigger message to be sent includes being directed to cause the remote interface trigger message to be sent to the remote device to direct the remote device to present a remote data entry input interface on a display of the remote device, the remote data entry input interface being presented based on context information of an environment in which the remote device is installed.

12. The apparatus of claim 7, wherein the apparatus comprises the device, the device being a mobile communications device.

13. The apparatus of claim 12, wherein the apparatus further comprises a communications interface including an antenna, the communications interface being configured to establish connecting with the remote device.

14. A computer program product comprising a non-transitory computer readable medium having computer program code stored thereon, the computer program code being configured to, when executed, direct an apparatus to:
receive, at a device, a data entry field selection message, from a remote device, notifying that data entry is desired, the data entry field selection message comprising a description of an event associated with a user input on a data entry field;
generate an interface trigger event, local to the device, to present the data entry input interface on a display of the device in response to receiving the data entry field selection message;
inhibit, at a remote user interface server module of the device, a presentation of the data entry input interface on the device, wherein inhibiting the presentation of the data entry input interface includes intercepting the interface trigger event to thereby inhibit the presentation of the data entry input interface on the display of the device; and
cause a remote interface trigger message to be sent from the remote user interface server module of the device to the remote device to direct the remote device to present a remote data entry input interface on a display of the remote device to facilitate entry of data associated with the data entry field.

15. The computer program product of claim 14, wherein the program code configured to direct the apparatus to cause the remote interface trigger message to be sent includes being configured to direct the apparatus to cause the remote interface trigger message to be sent to the remote device in response to intercepting the interface trigger event.

16. The computer program product of claim 14, wherein the program code configured to direct the apparatus to inhibit the presentation of the data entry input interface includes being configured to direct the apparatus to implement a terminal mode application on the device, the terminal mode application being configured to inhibit generation of an interface trigger event that would cause the presentation of the data entry input interface on the display of the device.

17. The computer program product of claim 14, wherein the program code is further configured to direct the apparatus to generate an interface trigger event, local to the device, to present the data entry input interface on the display of the device in response to receiving the data entry field selection, the interface trigger event indicating a type of data entry input interface to be presented;
wherein the program code configured to direct the apparatus to inhibit the presentation of the data entry input interface includes being configured to direct the apparatus to intercept the interface trigger event to thereby inhibit the presentation of the data entry input interface on the display of the device; and wherein the program code configured to direct the apparatus cause the remote interface trigger message to be sent includes being configured to direct the apparatus to cause the remote interface trigger message to be sent to the remote device in response to intercepting the interface trigger event, the remote interface trigger message including the type of data entry input interface to be presented.

18. The computer program product of claim 14, wherein the program code configured to direct the apparatus to cause the remote interface trigger message to be sent includes being configured to direct the apparatus to cause the remote interface trigger message to be sent to the remote device to direct the remote device to present a remote data entry input interface on a display of the remote device, the remote data entry input interface being presented based on context information of an environment in which the remote device is installed.

\* \* \* \* \*